United States Patent

Dischert

[15] 3,651,250

[45] Mar. 21, 1972

[54] TELEVISION CAMERA UTILIZING A PARALLEL-STRIPED COLOR ENCODING FILTER

[72] Inventor: Robert Adams Dischert, Burlington, N.J.

[73] Assignee: RCA Corporation

[22] Filed: June 30, 1969

[21] Appl. No.: 837,651

[52] U.S. Cl. ....................................178/5.4 ST, 350/162 SF
[51] Int. Cl. .........................................................H04n 9/06
[58] Field of Search..................178/5.4 ST, DIG. 31, DIG. 2; 350/162 SF

[56] References Cited

UNITED STATES PATENTS

| | | | |
|---|---|---|---|
| 3,015,689 | 1/1962 | Hirsch | 178/5.4 ST |
| 3,075,432 | 1/1963 | Myers | 178/5.4 ST |
| 3,419,672 | 12/1968 | Macouski | 178/5.4 ST |

OTHER PUBLICATIONS

RCA Technical Notes TN No. 136 March 12, 1958

*Primary Examiner*—Robert L. Richardson
*Assistant Examiner*—Donald E. Stout
*Attorney*—Eugene M. Whitacre

[57] ABSTRACT

A parallel-striped color encoding filter balanced for white light is placed in front of a television camera pickup tube to encode scene light. The signal obtained from the pickup tube is decoded electrically to yield two color difference signals which may be matrixed to produce signals representative of the red, green and blue light from the scene. The average transmission of the encoding filter produces low frequency components which are representative of the brightness of the scene.

19 Claims, 5 Drawing Figures

INVENTOR
ROBERT A. DISCHERT
BY Eugene M. Whitacre
Attorney

INVENTOR.
ROBERT A. DISCHERT
BY Eugene M. Whitacre
Attorney

TELEVISION CAMERA UTILIZING A PARALLEL-STRIPED COLOR ENCODING FILTER

BACKGROUND OF THE INVENTION

This invention relates to television cameras utilizing a spatial color encoding filter in front of a pickup tube for encoding colored light from a scene.

It is known that a color encoding stripe filter may be placed in front of the photosensitive element of a television camera pickup tube to encode colored light from a scene. The color information is derived from the pickup tube as phase and amplitude modulation of the sidebands of a carrier wave as the photosensitive element is scanned by an electron beam. The frequency of the carrier wave is determined by the number of color encoding strips scanned by the pickup tube electron beam during a scanning interval of predetermined duration. Encoding more than one color on the photosensitive electrode of a single pickup tube reduces the number of pickup tubes required in a camera for producing signals representative of colored light from a scene. Such an arrangement reduces the size, weight, and cost of a color television camera and overcomes the difficulty of registering the rasters of three separate pickup tubes as in one commonly employed type of conventional color television camera.

One arrangement of a single tube color television camera is disclosed in U.S. Pat. No. 2,733,291 to R. D. Kell. Kell discloses a color encoding filter having stripes for encoding red and blue light and a transparent area for passing a signal representative of the brightness of the scene. The spacing of the color encoding stripes is such that the red and blue scene light is encoded on separate carrier frequencies. The signals derived from the pickup tube are separated on a frequency selective basis, detected and combined with the luminance signal to produce red, blue and green color representative signals.

Another arrangement for encoding more than one color on the photosensitive electrode of a single television camera pickup tube is disclosed in U.S. Pat. No. 3,378,633 to A. Macovski. Macovski utilizes a spatial color encoding filter having a first grid of alternate cyan and transparent strips and a second grid having alternate yellow and transparent strips superimposed over the first grid with the strips of the first and second grids angularly disposed with relation to each other. The angular disposition of the two gratings having the same spatial frequency results in two carrier frequencies being generated when the filter stripe pattern imaged on the photosensitive element is scanned by the electron beam of the pickup tube. The cyan strips encode minus red and the yellow strips encode minus blue light. The electrical signals representative of these colors may be separated on a frequency selective basis. The average transmission of the Macovski encoding filter produces a low frequency band of signals representative of the brightness of the scene. The low frequency signals are subtracted from the encoded color signals obtained from the high frequency carriers to produce the desired color signals for application to a color receiver or a television transmitter.

Both the Kell and Macovski encoding filters yield encoded color signals having a separate carrier frequency for each encoded color. The separate carrier frequencies may combine with each other to produce a beat frequency which appears in the brightness signal. Also, care must be taken that the signals at the high carrier frequencies track the lower frequency components with varying levels of illumination so that the correct color signals are obtained when the detected carrier signals and the low frequency brightness signals are combined in the processing circuitry.

It is known that a color encoding filter having only parallel-spaced encoding stripes may be used to encode more than one color on the photosensitive electrode of a television camera pickup tube. For example, a repetitive pattern of red, blue and green stripes may be utilized in the encoding filter to produce an electrical signal having one fundamental carrier frequency, the sidebands of which are modulated in amplitude and phase corresponding to the intensity and color of the light. However, it is necessary to utilize phase detection of the carrier to separate the color information. In the past, this has been accomplished, for example, by adding a fourth stripe in the repetitive pattern of the color encoding stripes to generate a reference signal which may be used in a phase detection scheme to recover the color phase information. If the indexing stripe for the reference carrier is opaque, the overall efficiency of the encoding filter will be reduced because the opaque stripe will absorb light and reduce the light transmission of the encoding filter. If the indexing stripe is other than opaque, it will generate a signal which must be subtracted from the decoded signals in order to ensure proper colorimetry. Also, in the case of the red, blue and green color encoding stripes the overall transmission of the filter will be relatively low because each of these stripes passes only a single color and blocks transmission of the other two primary colors.

A problem common to any encoding system in which it is desired to produce red, blue and green signals and a brightness or luminance signal from a single tube is that of producing a luminance signal which will closely match the response of the eye. In the United States it has been established that such a luminance signal consists of the following combination of red, blue and green:

$$0.59G + 0.30R + 0.11B.$$

The encoding filters described above cannot produce a brightness signal having these proportions of color directly so the various decoded signals must be matrixed to produce the required luminance signal. Such an arrangement requires additional circuitry and if the various color signals do not track each other over the normally encountered brightness range, colorimetry problems will exist and the quality of the luminance signal will be degraded.

It is an object of this invention to provide a simple and inexpensive single tube color television camera utilizing a parallel-striped color encoding filter for producing two color difference signals and a luminance signal.

According to the invention a color encoding filter for encoding light from a scene onto a photosensitive medium is provided. The filter comprises a grating of parallel color encoding stripes for encoding scene light as two color difference signals and a brightness signal. The filter stripes are selected to have equal transmissivity for white light such that no color difference signals are produced in the presence of white light. The strip pattern is arranged such that scanning of the photosensitive medium yields a carrier wave, its second harmonic and sidebands, containing two color difference signals having a quadrature phase relationship with each other.

In one embodiment the filter is disposed in front of a television camera pickup tube having a fiber optics faceplate. The composite signal obtained from the pickup tube is applied to a low pass filter for producing a signal corresponding to the brightness of the scene and to a high pass filter which passes the fundamental carrier wave, its second harmonic, and associated sidebands, which are modulated in phase and amplitude corresponding to the colored light and its saturation, respectively. The signals from the high pass filter are coupled to a first duty cycle detector which decodes a first color difference signal, and to means for shifting the phase of the second harmonic by 90°. The carrier and phase shifted second harmonic signals are coupled to a second duty cycle detector which decodes the second color difference signal. The two color difference signals and the brightness signals are coupled to means for combining the signals for producing red, green and blue representative signals.

In a second embodiment the encoding filter is disposed in front of a television camera pickup tube. The composite signals obtained from the pickup tube are coupled to a low pass filter for producing a brightness signal, a high pass filter for passing the second harmonic of the carrier wave and band-pass filter for passing the fundamental carrier wave. The carrier wave is multiplied by two and coupled to a first synchronous detector and to a 90° phase shifter. The phase shifted wave is coupled to a second synchronous detector. The second harmonic of the carrier wave is coupled to the first and second synchronous detectors to produce two color difference signals. The two color difference signals and the brightness signals are coupled to means for combining the signals for producing red, green and blue representative signals.

The invention is more fully described in the following specification taken in conjunction with the accompanying drawings of which:

Figure 1:
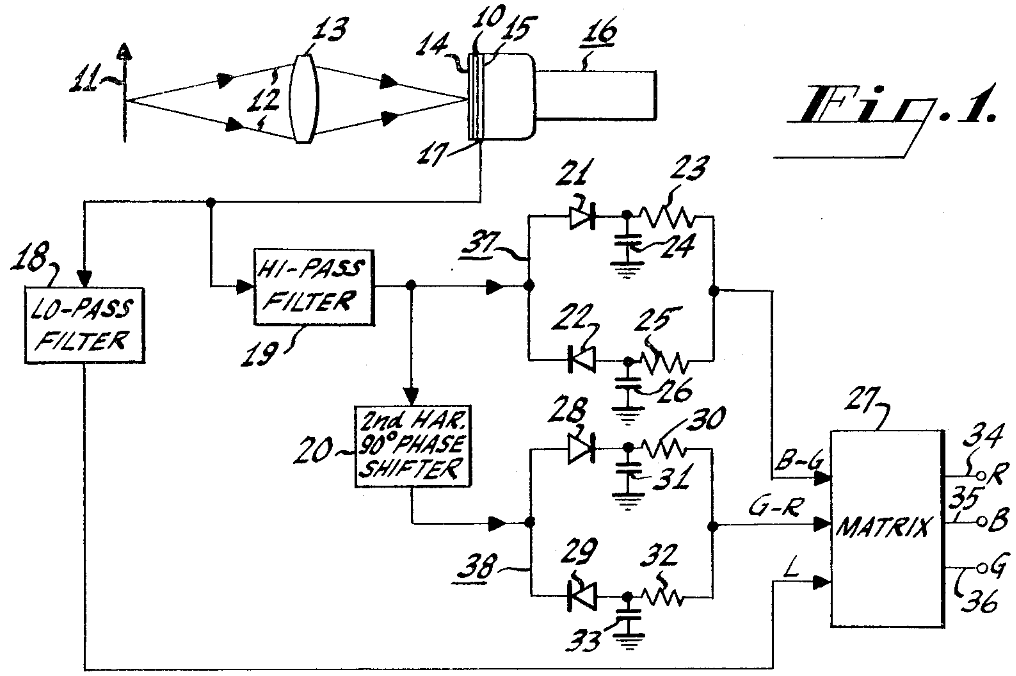
FIG. 1 is a functional diagram of a single tube color television camera embodying the invention.
Figure 2:
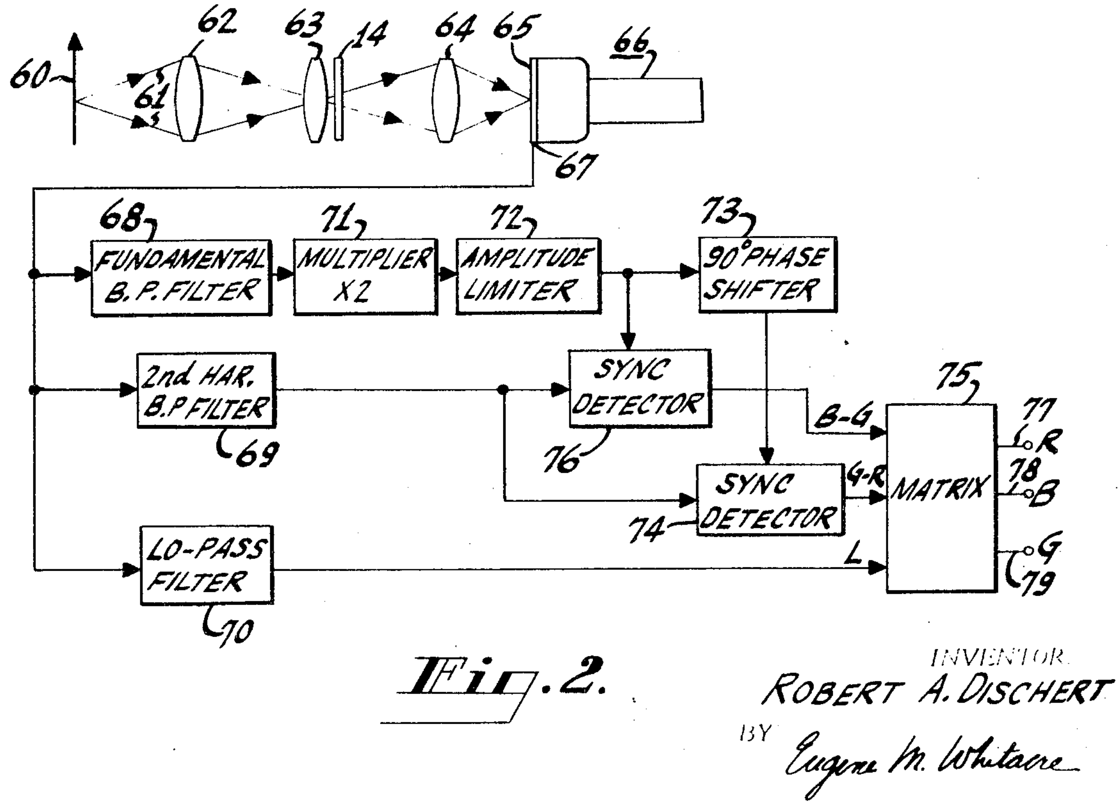
FIG. 2 is a functional diagram of another embodiment of a single tube color television camera embodying the invention.
Figures 3, 4, 5:
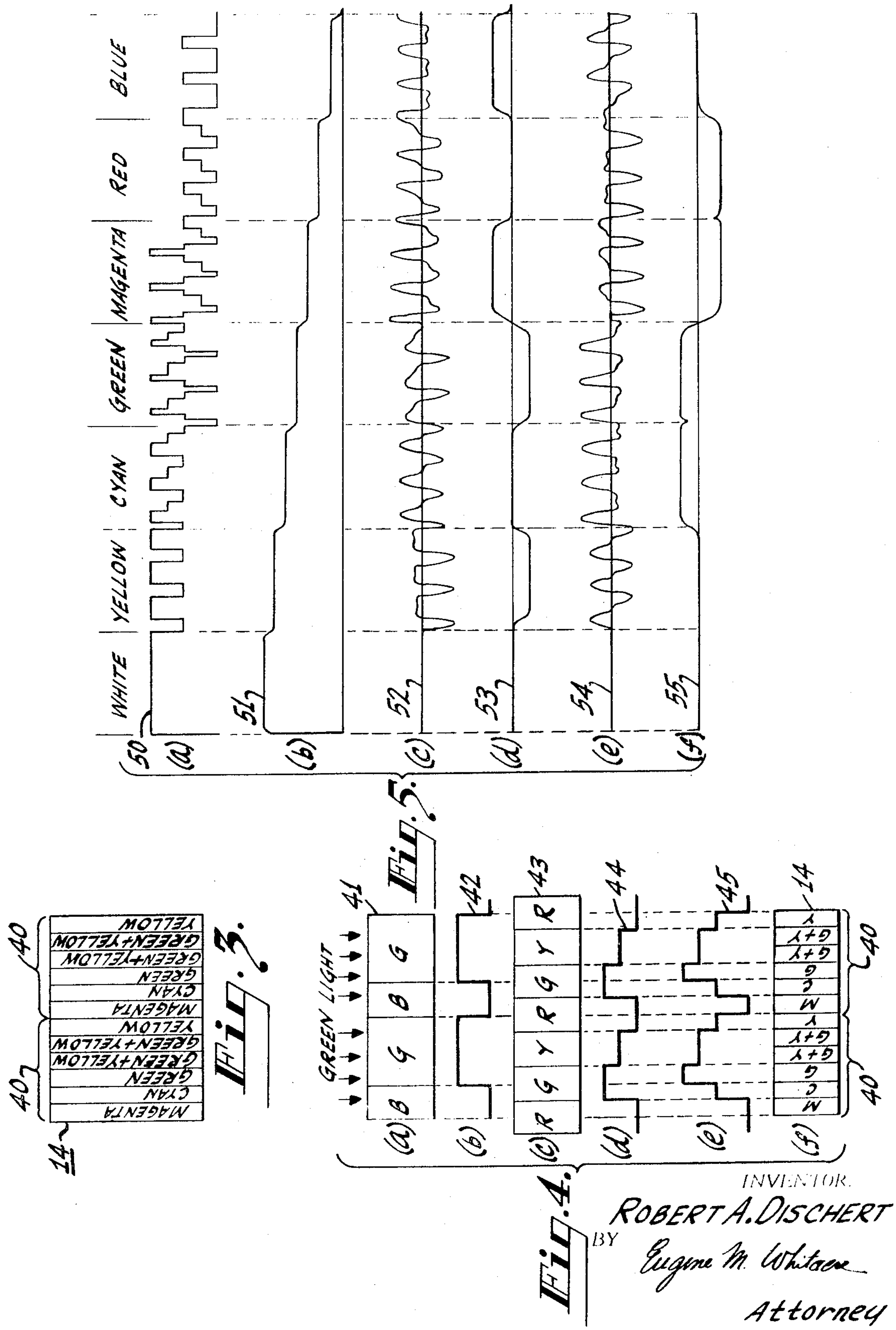
FIG. 3 illustrates a color encoding filter utilized in the invention.

FIG. 4 including FIGS. *4a–4f* illustrates the operation of the color encoding filter of FIG. 3; and FIG. 5 including FIGS. *5a–5f* illustrates the operation of the invention illustrated in FIGS. 1 and 2.

DESCRIPTION OF THE INVENTION

FIG. 1 illustrates a single-tube color television camera embodying the invention. Light rays 12 from an object 11 are focused by an objective lens 13 onto a parallel-striped color encoding filter 14 disposed adjacent a fiber optics faceplate 10 which is adjacent a photosensitive surface 15 of a television camera pickup tube 16. Color encoding filter 14 comprises a repetitive pattern of six colored stripes. As illustrated in FIG. 3, each repetitive section 40 of filter 14 comprises equal width magenta, cyan, green, green and yellow, green and yellow and yellow stripes. Although not shown, it is to be understood that suitable sources of operating potential are coupled to pickup tube 16 and suitable scanning means are provided to cause the electron beam to scan a raster at photosensitive surface 15. Electrical signals derived as the electron beam scans the photosensitive surface 15 at the standard television broadcast rates are obtained from an output terminal 17 and coupled to a high pass filter 19 and a low pass filter 18.

Low pass filter 18 may pass a band of frequencies, for example, from 0 to 1 Megahertz (MHz) representative of the brightness of the scene. The signals obtained from low pass filter 18 are coupled to an input terminal of matrix 27.

High pass filter 19 is selected to have a bandpass, for example, from 1 to 5 MHz. Thus, it can can pass a carrier wave centered at 2 MHz, its second harmonic at 4 MHz and 1 MHz sidebands centered about the 2 MHz carrier wave and its second harmonic. The signals obtained from high pass filter 19 are coupled to a first detection network 37. Detection network 37 comprises a series connected diode 21 and a resistor 23, which are connected tin parallel within a series connected diode 22 and a resistor 25. Diodes 21 and 22 are oppositely poled. A capacitor 24 is connected from the junction of diode 21 and resistor 23 to ground. A capacitor 26 is connected from the junction of diode 22 and resistor 25 to ground. The junction of resistors 23 and 25 is coupled to an input terminal of matrix 27.

The signals obtained from high pass filter 19 are also coupled to a phase shifter 20 which shifts the phase of the second harmonic of the carrier frequency obtained from pickup tube 16 by 90°. The signals obtained from phase shifter 20 are coupled to a second detection network 38.

Detection network 38 comprises a series connected diode 28 and a resistor 30 which are connected in parallel with a series connected diode 29 and a resistor 32. Diodes 28 and 29 are oppositely poled. A capacitor 31 is connected from the junction of diode 28 and resistor 30 to ground. A capacitor 33 is connected from the junction of diode 29 and resistor 32 to ground. The junction of resistors 30 and 32 is coupled to an input terminal of matrix 27. Signals representative of the colored light from object 11 are obtained from output terminals 34, 35 and 36 of matrix 27. These signals may be, for example, red, blue and green light representative signals as will be explained below.

In operation the light reaching photosensitive surface 15 is encoded by color encoding filter 14 shown in FIG. 3. Fiber optics faceplate 10 fitted to the front of pickup tube 16 permits the image which is in focus in the plane of encoding filter 14 to be in focus at photosensitive surface 15 also. A pickup tube having an ordinary glass faceplate could also be utilized in this system but then the image would not be in perfect focus at both encoding filter 14 and photosensitive surface 15. The frequency of the carrier wave obtained at output terminal 17 of FIG. 1 is determined by the number of sections 40 of filter 14 scanned by the electron beam during each line or horizontal scanning interval. At the U.S. horizontal scanning rate of 15,750 lines per second and an active scanning interval of approximately 53 microseconds, about 106 sections 40 of encoding filter 14 will produce a carrier of approximately 2 MHz.

The average light transmission of color encoding filter 14 produces a brightness or luminance signal which is bandpass limited to 1 MHz by low pass filter 18. High pass filter 19 passes the 2 MHz carrier, its second harmonic and associated sidebands. The operation of encoding filter 14 will be described in conjunction with FIGS. *4a–4f*.

Referring to FIG. 4, the color encoding filter 14 may be considered, for analysis, as being made up of two separate additive gratings. FIG. *4a* shows a grating 41 comprising alternate blue and green stripes. The stripes are twice the width of the blue stripes. The green and blue stripes are selected to be balanced (transmit equally) for each of white and cyan light; i.e., there will be no carrier wave produced in the presence of white or cyan light. The production of signals by filter 14 will be discussed assuming that green light from the scene to be televised impinges upon the filter. FIG. *4b* illustrates a waveform 42 produced by scanning pickup tube 16 when using filter grating 41 of FIG. *4a*. It can be seen that there is minimum transmission by the blue stripes and maximum transmission of the green light by the green stripes. With green light impinging on grating 41 the pattern imaged onto the pickup tube is such that when scanned the negative peaks of the carrier wave and its second harmonic coincide, producing a composite waveform which yields a peak negative signal representative of green light. (For blue light impinging on the grating 41 the phase of the second harmonic shifts such that the positive peaks of the carrier and its second harmonic coincide, yielding a peak positive signal representative of blue light.)

FIG. *4c* illustrates a second grating 43 which along with grating 41 is incorporated in color encoding filter 14. Grating 43 comprises a repetitive pattern of equal width red, green and yellow stripes. The stripes are selected to be balanced for each of white and yellow light; i.e., no carrier wave is produced in the presence of white or yellow light. FIG. *4d* illustrates a waveform 44 produced by scanning pickup tube 16 when using grating 43 with green light impinging upon it. The response of the red stripes is minimum, the response of the green stripes is maximum and the response of the yellow stripes (yellow is considered as comprising equal parts of red and green) is approximately half that of the green. With green light impinging on grating 43 the pattern imaged onto the pickup tube is such that when scanned a composite waveform containing a carrier wave and its second harmonic is formed having a general shape of a staircase down to the right as indicated by FIG. *4d*. (For red light impinging on grating 43 the carrier and its second harmonic form a waveform having a general shape of a staircase up to the right). It should be noted that a stairstep wave, such as shown in FIG. *4d*, is balanced about its AC axis; i.e., it has equal positive and negative portions, and when applied to a peak detector, will not yield a difference signal. Advantage is taken of this fact when the composite wave obtained from filter 14 of FIG. 3 is applied to the decoding circuitry as will be explained subsequently.

It is necessary that the carriers and second harminics of the respective gratings 41 and 43 do not cancel when combined. To prevent this the carriers and harmonics of the gratings may be phased 90° from each other. The width of a section of grating 41, comprising a blue and a green stripe, and a section of grating 43, comprising a red, a green and a yellow stripe, is the same, so the carriers and harmonics will have the same frequency when the stripe pattern imaged onto the pickup tube is scanned by the electron 4, As shown by the vertical dotted lines in FIG. 4 grating 43 is displaced in the scanning direction from grating 41 a distance equal to half the width of a stripe in grating 43. The width of the green stripes of grating 41 is considered to be a double stripe width. The additive response of combined gratings 41 and 43 is shown by waveform 45 of FIG. 4*e*. Waveform 45 represents the sum of waveforms 42 and 44 of FIGS. 4*b* and 4*d*, respectively. The offsetting of gratings 41 and 43 by half a stripe width results in two color difference signals having a phase quadrature relationship being contained in a carrier wave and its second harmonic. This offsetting aligns the stripes such that the B–G and G–R carriers are electrically phased at 90° to each other. Grating 14 of FIG. 4*f* illustrates the addition of the responses of gratings 41 and 43 of FIGS. 4*a* and 4*c*, respectively. In FIG. 4*f*, two of the repetitive sections 40 of grating 14 are shown. The vertical dotted lines between FIGS. 4*a*–4*f* indicate the relationship between color encoding filter 14 of FIG. 4*f* and the waveform 45 of FIG. 4*e* obtained as the photosensitive element of the pickup tube is scanned as green light impinges upon the filter.

FIG. 5 illustrates various waveforms present in the embodiment of the invention shown in FIG. 1 and is helpful in understanding how the color difference signals are encoded in quadrature phase relationship on a carrier wave and its second harmonic and how the signals are subsequently decoded. FIG. 5*a* illustrates the ideal response of color encoding filter 14 to light of the colors indicated for the separate portions of waveform 50. For convenience, each portion of waveform 50 between adjacent vertical reference lines illustrates the response for three sections 40 of encoding filter 14 illustrated in FIG. 3. The response for white light is uniform across the filter 14 because all of the filter stripes are selected to have equal transmission for white light. Thus, no carrier wave will be produced in the presence of white light. In FIG. 4, for analysis purposes, filter 14 was broken into two gratings and the response of each grating to green light was shown. In FIG. 5*a* the response of the entire filter 14 for light of various colors is shown. In FIG. 5*b* waveform 51 illustrates the signal derived from pickup tube 16 representative of the average transmission of the filter for light of various colors. The average transmission of the filter is used to provide a luminance signal representative of the brightness of scene. This luminance signal is bandwidth limited to 1 MHz. Luminance signal 51 is obtained at the output terminal of low pass filter 18 of FIG. 1.

As mentioned previously the luminance signal is derived from the average light transmission of the entire encoding filter 14. Considering a single section 40 of filter 14, it can be seen that each of the six equal width stripes encompasses one-sixth of the area of each section 40 of filter 14. By analyzing each section 40 in terms of the summation of the amount of red, blue and green light transmitted by the stripes in that section (for example, a magenta stripe transmits equal quantities of red and blue but no green and a cyan stripe transmits equal quantities of blue and green but no red), it can be determined that the light transmitted by each section 40 of the ideal filter comprises substantially 0.58G + 0.25R + 0.17B. This luminance signal approaches the NTSC luminance signal comprising 0.59G + 0.30R + 0.11B. By proper selection of the colored stripe material the filter can be made to transmit the desired NTSC luminance signal, thereby eliminating the need of a matrix for forming the luminance signal by combining the red, green and blue signals electrically.

Waveform 52 of FIG. 5*c* illustrates a combined waveform comprising a modulated carrier wave and its second harmonic. The waveform is obtained at the output terminal of high pass filter 19 of FIG. 1. The various portions of waveform 52 correspond to the electrical signal obtained as a result of scanning of the pickup tube as light of the colors indicated at the top of FIG. 5 impinge upon the color encoding filter 14. There are relatively negative polarity signals produced in the presence of yellow light and green light and relatively positive polarity signals produced in the presence of magenta and blue light. In the presence of cyan and red light the positive and negative signals are of equal amplitude and therefore cancel in the detection networks to be described.

Waveform 53 of FIG. 5*d* illustrates the decoded B–G color difference signal obtained from detection network 37 of FIG. 1. As previously mentioned waveform 52 of FIG. 5*c* is applied to an input terminal of detection network 37. Diode 21 conducts during the positive portions of waveform 52 and charges capacitor 24 to the peak positive voltage. The positive and negative portions of waveforms 52 are designated with respect to the AC axis. Diode 22 conducts during the negative portions of waveform 52 and charges capacitor 26 to the peak negative voltage. Thus, the voltages across capacitors 24 and 26 are of different polarity and the voltage obtained at the junction of resistors 23 and 25 is the difference between the positive and negative voltages across capacitors 24 and 26. This voltage is the electrically decoded B–G color difference signal. In the presence of a combined carrier and second harmonic wave having equal positive and negative portions such as illustrated in the portions of waveform 52 of FIG. 5*c* corresponding to cyan and red light, diodes 21 and 22 will charge capacitors 24 and 26 equally and oppositely. Therefore, no color difference signal will appear at the junction of resistors 23 and 25.

FIG. 5*e* illustrates a waveform 54 representative of the carrier frequency and its second harmonic with the second harmonic phase shifted 90° with respect to waveform 52 of FIG. 5*c*. Waveform 54 is obtained at the output terminal of phase shifter 20 of FIG. 1 and is applied to detection network 38 so that the G–R color difference signal may be electrically decoded. The operation of detection network 38 is similar to the operation of detection network 37 described above. Phase shifting of the second harmonic by 90° enables the decoded G–R color difference signal to be obtained at the junction of resistors 30 and 32. Phase shifting of the second harmonic changes the character of the combined carrier and second harmonic such that the stairstep portions of waveform 52 of FIG. 5*c* become peak portions of waveform 54 and can thus be detected by network 38. Waveform 55 of FIG. 5*f* illustrates the detected G–R waveform. Thus, detection networks 37 and 38 decode the quadrature phases of the carrier and its second harmonic and produce the decoded B–G and G–R signals which are coupled to matrix 27.

In matrix 27 the G–R, B–G and luminance signals may be combined for producing separate red, blue and green color representative signals which are obtained at output terminals 34, 35 and 36.

Referring to FIG. 2, a functional block diagram of another embodiment of the invention is illustrated. Light rays 61 from an object 60 are imaged by objective lens 62 through field lens 63 onto color encoding filter 14 located in a first image plane. Color encoding filter 14 may be identical to the one described in conjunction with FIG. 1. The color encoding stripe pattern of filter 14 and the scene is imaged by relay lens assembly 64 onto a photosensitive element 65 of an image pickup tube 66. As photosensitive element 65 is scanned by an electron beam, the carrier waveform and its second harmonic are amplitude modulated at particular phases to contain the B–G and G–R color signals, and these signals are obtained from output terminal 67 of pickup tube 66. Terminal 67 is connected to a fundamental bandpass filter 68, a second harmonic bandpass filter 69 and a low pass filter 70. Low pass filter 70 has a response from 0 to 1 MHz and the luminance signal obtained from this filter is coupled to an input terminal of matrix 75.

Bandpass filter 69 passes the second harmonic and sidebands of the carrier waveform obtained from the pickup tube. The carrier waveform may have a center frequency of 2 MHz in which case the second harmonic is 4 MHz. If a 1 MHz sideband is desired, the second harmonic bandpass filter 69 is selected to have a bandpass from 3 to 5 MHz. The second harmonic and sidebands obtained from bandpass filter 69 are coupled to synchronous detectors 76 and 74.

The signals obtained from output terminal 67 of pickup tube 66 are also coupled to bandpass filter 68 which is a bandpass filter centered at the carrier frequency of 2 MHz. The 2 MHz signal is multiplied by multiplier 71 to produce a 4 MHz signal. The 4 MHz signal is amplitude limited by amplitude limiter 72 and applied to synchronous detector 76 for providing a reference wave for the detector. The 4 MHz signal obtained from amplitude limiter 72 is also coupled to a phase shifter 73 which shifts the phase of the 4 MHz signal by 90°. The phase shifted 4 MHz signal is coupled to synchronous detector 74 to provide a reference wave for the detector. Thus, the output signals of synchronous detectors 74 and 76 are the decoded G–R and B–G color signals, respectively, which were encoded as quadrature phases of the carrier wave by encoding filter 14.

The B–G, G–R and luminance signals are coupled to matrix 75 for producing red, blue and green signals representative of the colored light from the scene to be televised.

It should be noted that in the embodiment illustrated in FIG. 2 the carrier wave is rejected by second harmonic bandpass filter 69 and therefore all of the encoded color information is contained in the second harmonic and its sidebands. In this respect the waveforms applied to the synchronous detectors 74 and 76 differ somewhat from either of the waveforms 52 and 54 of FIGS. *5c* and *5e*, respectively, in that the fundamental carrier is not included. Instead of shifting the phase of the encoded signal applied to the detectors 74 and 76, the reference wave applied to detector 74 is shifted by 90° with respect to the reference wave coupled to detector 76. Thus, the quadrature phase information is obtained from the two synchronous detectors 74 and 76 and these waveforms would be similar to the B–G and G–R signals illustrated by waveforms 53 and 55 of FIGS. *5d* and *5f*, respectively.

The optical systems utilized in the embodiments shown in FIGS. 1 and 2 may be interchanged as the effect of both systems is to image the scene and the encoding filter stripe pattern onto the photosensitive element of the pickup tube. A pickup tube having a fiber optics faceplate may also be used with the arrangement shown in FIG. 2 for providing sharp imaging of both the scene and the encoding filter pattern onto the photosensitive element.

Two decoding systems have been shown to illustrate how two color difference signals encoded on quadrature phases of a carrier wave and its second harmonic may be decoded. It should be noted that any decoder able to decode a phase quadrature signal may be utilized for this purpose. In any decoding system used, the advantages of the described invention will be obtained because no external reference signal is needed to decode the two color difference signals because of the inherent characteristic of the quadrature phase encoded color difference signals formed by the encoding filter according to the invention to be decoded without an external reference signal.

It should be noted that the stripes of the encoding filter do not have to be disposed perpendicular to the scanning direction of the electron beam of the pickup tube. For example, it may be desirable to place the stripes at such an angle to the direction of scan so that the signals on adjacent lines may be interlaced.

What is claimed is:

1. A color encoding filter having a plurality of color transmission sections, each section comprising a plurality of different colored stripes in which the transmissivity is selected such that in terms of green, red and blue light components which are transmitted by the filter, the average transmissivity of each section of stripes is substantially 0.59G + 0.30R + 0.11B wherein G is defined as green, R as red and B as blue.

2. A color encoding filter having a repetitive pattern of stripes of at least five colors including at least one stripe being of one primary color a primary color being one of the colors red, blue or green and the other stripes being of colors comprising at least the sum of two of three primary colors, said stripes being selected and arranged for producing, when an image of said stripe pattern on a photosensitive electrode is scanned, an electrical signal comprising a brightness signal and a carrier wave signal having the difference between first and second and first and third of three colors encoded in phase quadrature on said carrier wave signal.

3. A color encoding filter according to claim 2 wherein said stripes are selected to have equal transmissivity for white light whereby no carrier wave is generated in the presence of white light.

4. A color encoding filter according to claim 3 wherein said repetitive pattern includes four stripes, each having a first width, and a fifth stripe having a width substantially equal to twice said first width.

5. A color encoding filter according to claim 4 wherein;

said four stripes are of material for passing magenta, cyan, green and yellow light, respectively;

said fifth stripe is of a material for passing green and yellow light, and said fifth stripe being interspersed between said green and yellow stripes, whereby said color difference signals are representative of blue minus green light and green minus red light.

6. A color television camera comprising:

an image pickup tube;

a color encoding filter having a plurality of color transmission sections, each section comprising a plurality of stripes for respectively passing light of different colors in which the transmissivity is selected such that in terms of green, red and blue light components which are transmitted by the filter, the average transmissivity of each filter section is substantially 0.59G + 0.30R + 0.11B wherein G is defined as green, R as red and B as blue;

means for imaging said color encoding filter sections and a scene onto the photosensitive element of said image pickup tube for producing color representative signals and a brightness signal at the output electrode of said pickup tube as said photosensitive element is scanned;

means coupled to said pickup tube for separating said brightness signal from said color representative signals; and means coupled to said pickup tube for detecting said color representative signals.

7. A color television camera according to claim 6 wherein said transmissivity of each filter section is uniform for white light and wherein each filter section has a nonuniform transmissivity for colored light such that no color representative signals are generated in the presence of white light and two color difference signals are generated in the presence of colored light.

8. A color television camera according to claim 7 wherein each filter section contains four stripes of a first width of material for passing light of four different colors and one stripe of substantially twice said first width for passing light of a fifth color for producing said two color difference signals having a phase quadrature relationship to each other.

9. A color television camera according to claim 8 wherein said four stripes are of material for passing magenta, cyan, green and yellow light, respectively, and said fifth stripe, interspersed between said green and said yellow stripes, is of a material for passing green and yellow light, whereby said color difference signals having a phase quadrature relationship are blue minus green and green minus red.

10. A color television camera comprising:

an image pickup tube;

a color encoding filter having a plurality of color transmission sections, each section comprising a plurality of stripes for respectively passing light of different colors in which the transmissivity is selected such that in terms of green, red and blue light components which are transmitted by the filter, the average transmissivity of each filter section is substantially 0.59G + 0.30R + 0.11B for encoding light as a brightness signal and two color representative signals wherein G is defined as green, R as red and B as blue;

means for imaging a scene and said color encoding filter onto the photosensitive element of said pickup tube whereby a brightness signal and two color representative signals contained in phase quadrature relationship on a carrier wave and its harmonics are generated as an electron beam scans said photosensitive element;

means coupled to said pickup tube for separating said brightness signal from said carrier wave and said harmonic;

first and second peak detection means;

means coupling said carrier wave and its second harmonic to said first peak detection means for producing a first color difference signal of a polarity corresponding to the larger of the positive and negative portions of said carrier wave and its harmonic;

means coupled to said pickup tube for shifting the phase of said second harmonic by 90° and for coupling said carrier and phase shifted second harmonic to said second peak detection means for producing a second color difference signal of a polarity corresponding to the larger of the positive and negative portions of said carrier wave and said phase shifted second harmonic.

11. A television camera according to claim 10 wherein said color encoding filter is balanced for white light such that no color difference signals are produced in the presence of white light.

12. A television camera according to claim 11 wherein each of said filter sections has four stripes of a first width and one stripe having a width substantially equal to twice said first width.

13. A television camera according to claim 12 wherein the colors of said four stripes are magenta, cyan, green and yellow, and the color of said fith stripe, interspersed between said green and said yellow stripes, is green and yellow whereby said color difference signals are representative of green minus blue light and red minus green light.

14. A color television camera comprising:

an image pickup tube;

a color encoding filter having a plurality of color transmission sections, each section comprising a plurality of stripes for respectively passing light of different colors in which the transmissivity is selected such that in terms of green, red and blue light components which are transmitted by the filter, the average transmissivity of each filter section is substantially $0.59G + 0.30R + 0.11B$ for encoding light as a brightness signal and two color representative signals wherein G is defined as green, R as red and B as blue;

means for imaging a scene and said color encoding filter onto the photosensitive element of said pickup tube whereby a brightness signal and two color representative signals contained in phase quadrature relationship on a carrier wave and its harmonics are generated as an electron beam scans said photosensitive element;

first and second synchronous detection means;

bandpass filter means for passing said carrier wave;

means coupling said carrier wave to said bandpass filter means;

means for multiplying said bandpassed carrier wave by a factor of two;

means coupling said multiplied carrier wave to said first synchronous detector for providing a reference wave therefor;

means for shifting the phase of said multiplied carrier wave by 90°;

means coupling said phase shifted multiplied carrier wave to said second synchronous detector for providing a reference wave therefor;

bandpass filter means coupled to said pickup tube for passing said second harmonic and associated sidebands of said carrier wave, and means coupling said bandpassed second harmonic to said first and second synchronous detectors for producing said two color difference signals.

15. A television camera according to claim 14 wherein said color encoding filter is balanced for white light such that no color difference signals are produced in the presence of white light.

16. A television camera according to claim 15 wherein each of said filter sections has four stripes of a first width and one stripe having a width substantially equal to twice said first width.

17. A television camera according to claim 16 wherein the colors of said four stripes are magenta, cyan, green and yellow, and the color of said fifth stripe, interspersed between said green and said yellow stripes, is green and yellow whereby said color difference signals are representative of green minus blue light and red minus green light.

18. A color television camera comprising:

a color encoding filter having a plurality of color transmission sections each section comprising a plurality of stripes for respectively passing light of different colors in which the transmissivity is selected such that in terms of green, red and blue light the average transmissivity of each section is substantially $0.59G + 0.30R + 0.11B$ for encoding light as a brightness component and at least two color representative components wherein G is defined as green, R as red and B as blue;

an image pickup tube having a fiber optics faceplate disposed adjacent a photosensitive element; and means for imaging light from a scene and said encoding filter onto said fiber optics faceplate and thereby onto said photosensitive element for producing a composite electrical signal representative of said brightness component and said at least two color representative components as said photosensitive element of said pickup tube is scanned.

19. A color encoding filter according to claim 1 wherein the transmissivity of each filter section is substantially uniform for white light.

* * * * *

UNITED STATES PATENT OFFICE
CERTIFICATE OF CORRECTION

Patent No. 3,651,250 Dated March 21, 1972

Inventor(s) Robert Adams Dischert

It is certified that error appears in the above-identified patent and that said Letters Patent are hereby corrected as shown below:

Column 3, Line 52, delete "tin" and substitute -- in --;

Column 4, Line 26, after "The" (first occurrence) insert -- green --; Column 5, Line 5, after "electron" delete "4" and substitute -- beam --; Column 10, Line 40, after "light" add -- components which are transmitted by the filter --

Signed and sealed this 21st day of November 1972.

(SEAL)
Attest:

EDWARD M.FLETCHER,JR.
Attesting Officer

ROBERT GOTTSCHALK
Commissioner of Patents